United States Patent [19]

Shibata et al.

[11] Patent Number: 5,568,184

[45] Date of Patent: Oct. 22, 1996

[54] MULTI-POINT MOTION PICTURE ENCODING AND DECODING APPARATUS

[75] Inventors: Koichi Shibata, Kokubunji; Taizo Kinoshita, Musashimurayama, both of Japan

[73] Assignee: Hitachi, Ltd., Tokyo, Japan

[21] Appl. No.: 440,710

[22] Filed: May 15, 1995

Related U.S. Application Data

[62] Division of Ser. No. 170,750, Dec. 21, 1993, Pat. No. 5,446,491.

[51] Int. Cl.$^6$ .................................................. H04N 7/15
[52] U.S. Cl. ................................................. 348/15; 348/16
[58] Field of Search .................................. 348/15, 14, 16, 348/17, 19, 13, 12, 10, 385, 563, 564, 565, 567; 358/86; H04N 7/15, 7/14, 7/16

[56] References Cited

U.S. PATENT DOCUMENTS

| | | |
|---|---|---|
| 5,001,702 | 3/1991 | Teraslinna et al. . |
| 5,157,491 | 10/1992 | Kassatly . |
| 5,231,492 | 6/1993 | Dangi et al. . |
| 5,365,265 | 11/1994 | Shibata ............................ 348/15 |
| 5,371,535 | 12/1994 | Takizawa . |

FOREIGN PATENT DOCUMENTS

| | | |
|---|---|---|
| 276938 | 11/1988 | Japan . |
| 82838 | 3/1990 | Japan . |
| 514882 | 1/1993 | Japan . |

*Primary Examiner*—Safet Metjahic
*Assistant Examiner*—Chris Grant
*Attorney, Agent, or Firm*—Antonelli, Terry, Stout & Kraus

[57] ABSTRACT

A display system for displaying a plurality of video windows on a display screen. A receiving element is included for receiving video data packets from a plurality of video sources in a time sharing manner, each of the video data packets including: coded video information for representing a partial image contained within one of a plurality of blocks constituting a video frame; attribute information for indicating at least a location of a block corresponding thereto within the video frame; and identification information of the video source. A decoder element is connected to the receiving element for decoding the coded video information extracted from each of the video data packets and for outputting a partial image corresponding to one of the blocks in the video frame. A set of frame memories are included for assembling partial images into video frames, each of the frame memories having a plurality of window areas located in a predetermined layout defined therein, and a set of the window areas each located at a same location within respective frame memories being associated with a same video source with respect to each other. A writing element is included for writing each partial image derived from the decoder element into one of the window areas within one of the frame memories which is specified in accordance with the identification information extracted from a video data packet related to the partial image and a utilization status of the window areas. Finally, an outputting element is included for selectively outputting contents of the frame memories on a display screen by changing over the frame memories depending upon a display position on the display screen thereby to present a plurality of video frames at a plurality of window areas on the display screen.

9 Claims, 11 Drawing Sheets

MULTI-POINT MOTION PICTURE ENCODING AND DECODING APPARATUS

This application is a 37 CFR §1.60 divisional of prior application Ser. No. 08/170,750, filed Dec. 21, 1993, now U.S. Pat. No. 5,446,491.

BACKGROUND OF THE INVENTION

1. Field of the Invention

The present invention relates to a multi-point motion picture conference system in which motion pictures are communicated via communication lines between terminals respectively installed at remote points, and in particular, to a motion picture coding (encoding) and decoding apparatus to send coded motion picture information to terminals at multiple points and to receive coded motion picture information sent therefrom.

2. Description of the Related Art

FIG. 1 shows a first example of a multi-point video conference system of a conventional technology. According to features of the example, there can be used terminals for use in a one-to-one (terminal-to-terminal) motion picture communication and there is disposed a multi-point conference connecting device 106 to simultaneously establish connections for motion pictures sent from the terminals installed at many points. For example, a terminal 101a disposed at a point A for a one-to-one motion picture or video communication includes an imaging device or a video camera 102a to produce an image of an object, a coder or an encoder 103a to encode a motion picture in conformity with a characteristic of a communication line and to send the picture via the line, a decoder 104a to decode the encoded information thus received so as to restore the original image, and a display 105a to present thereon the restored image. The device 106 includes coders 109a to 109d and decoders 108a to 108d respectively as many as there are terminals disposed as above and a video (image) synthesizer 107 to establish connections between the coders 109a to 109d and the decoders 108a to 108d. Each of the decoders 108a to 108d associated with respective communication channels decodes codes or symbols sent via the channel to restore the image. The decoded image thus prepared is subjected to a synthesizing process in the synthesizer 107 and then is again encoded by the coders 109a to 109d. The coded image is thereafter transmitted to the related terminals.

FIG. 2 shows a second example of the conventional multi-point video conference system. In accordance with an aspect of the example, each of the terminals includes a plurality of decoders respectively corresponding to terminals which may possibly be specified as communication partners. With this provision, the connecting device dedicated to the conference system of FIG. 1 can be dispensed with such that coded information sent via each channel can be independently controlled. For example, a terminal 201a at a point A includes a video camera 202a to produce an image of an object, a coder 203a to encode data of a motion picture in conformity with a characteristic of a communication line and to send the encoded data via the line, decoders 204ab, 204ac, and 204ad to receive codes via related channels and to thereby restore the data of the respective motion pictures, and a display 205a to display the restored image on a screen thereof. The constituent elements conduct operations similar to those of the associated components of FIG. 1. However, this example is different from the preceding example in that the codes received via the respective channels are decoded by the decoders 204ab, 204ac, and 204ad in an independent manner, thereby displaying synthesized images.

FIG. 3 shows a third example of the multipoint video conference system of the prior art. This system has been described in the JP-A-63-276938. It is assumed that this example is configured to be operated with a packet switching network. In this system, according to the number of points connected to each other via the network, an image attained from a video camera is encoded through contraction or compression thereof and is then transmitted to a terminal. As for the configuration, description will be representatively given of a terminal 301a arranged at a point A. The terminal 301a includes a video camera 302a, a screen contraction device 303a to minimize the size of image data 309 inputted thereto, a coder 304a to encode the screen image data 309 thus compressed and to thereby produce a packet output 310a, a multiplexer 305a to receive packets 310b to 310e sent from related terminals and to produce multiplexed data in the frame unit, a decoder 306a to decode the data so as to produce a synthesized image 312 in the frame unit, and a display 307a to display the synthesized image thus decoded.

In a case where the terminal A 310a is connected to other terminals disposed respectively at the remaining four points, the the size of the input image supplied from the imaging device 302a is compressed according to a contraction scale "¼". Namely, the size is minimized to be a quarter of the original size, thereby producing the contracted image 309. The resultant image is encoded by the coder 304a. On the receiver side, encoded data items respectively sent from the four terminals at the respective points are decoded for each frame in a time sharing manner so as to produce the synthesized image 312.

The conventional technologies are respectively attended with problems as follows.

In the first example, there is required the connecting device dedicated to the conference system. The number of connectible terminals is limited by that of the encoder-decoder pairs of the system. Moreover, with the connecting device, only one conference can be held at a time. In addition, due to repetitious encoding and decoding operations, the image quality is considerably deteriorated.

The second example necessitates a number of decoders as many as there are channels which may possibly be used to receive data. The number of connectible terminals is limited by that of the decoders. Furthermore, an equal number of terminals and decoders are required to be disposed. Consequently, for example, when the number of connected terminals is increased, the number of decoders is also increased. This remarkably increases the size of the terminal and hence the terminal resultantly becomes to be expensive.

According to the third example, the size of the presentable image is restricted by the number of connected terminals. In addition, although the image processing is accomplished in a frame unit, it is not particularly disclosed how to suppress mismatching with respect to the frame speed.

Moreover, each of the technologies above is attended with a problem that the number of connection channels is methodologically limited.

SUMMARY OF THE INVENTION

It is therefore an object of the present invention to provide a multi-point video conference system in which video communications to and from a plurality of points can be implemented without using any connecting device dedicated to the communications and in which each terminal includes a decoder so that pictures or images from a plurality of points can be concurrently received and displayed.

Another object of the present invention is to provide a multi-point video conference system in which the communication channels between the respective terminals are independent of each other such that an image receiving channel can be added to or deleted from each terminal within the processing capacity of the decoder thereof.

According to an aspect of the present invention, each terminal connected to a packet network includes a multi-point motion picture decoder including means for sequentially receiving codes of motion pictures in the form of packets via a multiplicity of channels and processing the codes from the respective channels in a time sharing manner, a shared frame memory for storing therein decoded images from the channels, and display frame memories. The number of the frame memories is associated with that of channels for which signals asynchronously arriving thereat are synchronized with a synchronizing signal on a signal receiving side. The terminal further includes a video coder for producing encoded video or picture signals conforming to the decoder.

In the means of processing the codes of the respective channels in the time sharing fashion, the codes of the received packets are processed in a receiving order thereof. Consequently, in a case where packets are received in an arbitrary order from the respective channels, the codes of the channels are decoded in the time sharing manner for each packet. In the shared frame memory, there can be stored the decoded images of all channels from which the images are being received. In consequence, for any channels, the codes can be decoded according to correlations between frames. Moreover, it is possible to extract from a packet a channel number indicating a source terminal of the packet so as to identify a location in the frame memory where the decoded image of the pertinent channel is stored. With provision of the display frame memory for each channel, the images asynchronously received from the associated channels can be synchronized to be outputted therefrom without any conflict.

In addition, regarding the system as a motion picture conference system, the number of connectible channels depends only on the code processing capacity of each terminal, the frame memory capacity, and the transmission speed of the communication network. In consequence, the number is not methodologically influenced, i.e., the number is not related to the method of the system. Selection of an image or a picture for reception thereof can be independently decided for each terminal on the receiving side. Consequently, it is possible for the user of the terminal to participate in two or more conferences. Moreover, there is provided a high degree of freedom of resolution for images to be communicated between terminals. For example, while limiting the number of connected terminals, there may be communicated high-resolution pictures. Conversely, low-resolution pictures can be communicated to and from a larger number of terminals. Namely, the picture resolution can be dynamically altered in the communication between the terminals.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to the accompanying drawings, description will be given of an embodiment according to the present invention.

This embodiment is implemented according to an algorithm described in the recommendation H. 261 for video encoding method standards of the International Telecommunication Union Telecommunication Standardization Sector (ITU-TS or ITU-T). In this configuration, there are included modifications to cope with packet transmission and connections between multiple points. Consequently, even when there is employed a video coding operation based on an algorithm other than that recommended by the ITU-TS, the advantageous effect of the present invention can be also attained only by conducting image processing similar to that of the present invention. However, the algorithm to be applied to this case is required to satisfy the following conditions. A screen is subdivided into quite small partitions, namely, blocks and the video coding is achieved in the block unit; moreover, the algorithm is established according to correlation between frames. In this connection, a term "block" in the following example is substantially comparable to "macro-block" of the recommendation H. 261.

Figure 1:
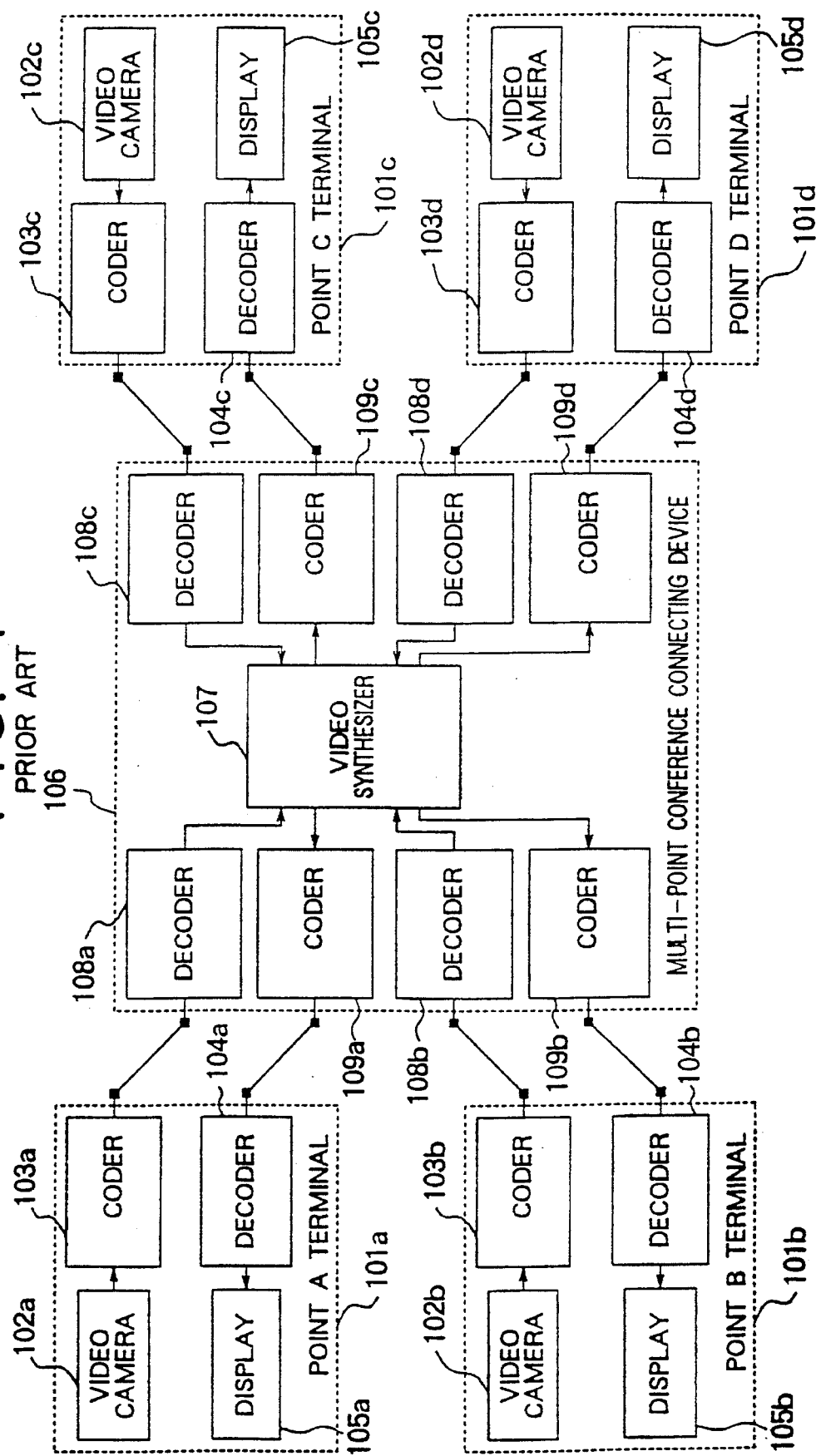
FIG. 1 is a diagram schematically showing a first conventional example of a (multi-point video) conference system in which a plurality of terminal points are connected to each other via video communications.
Figure 2:
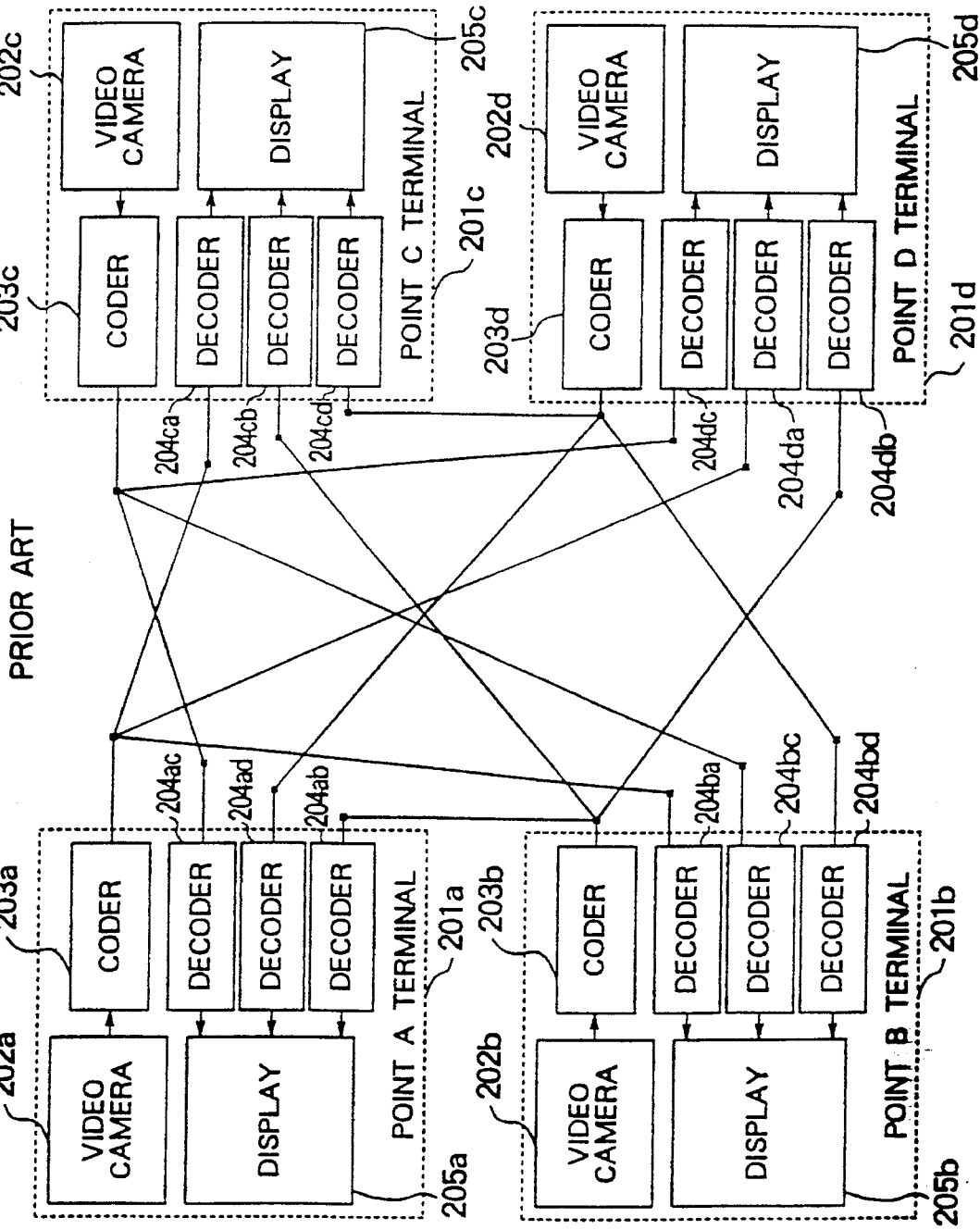
FIG. 2 is a diagram showing a second example of the conference system of the prior art.
Figure 3:
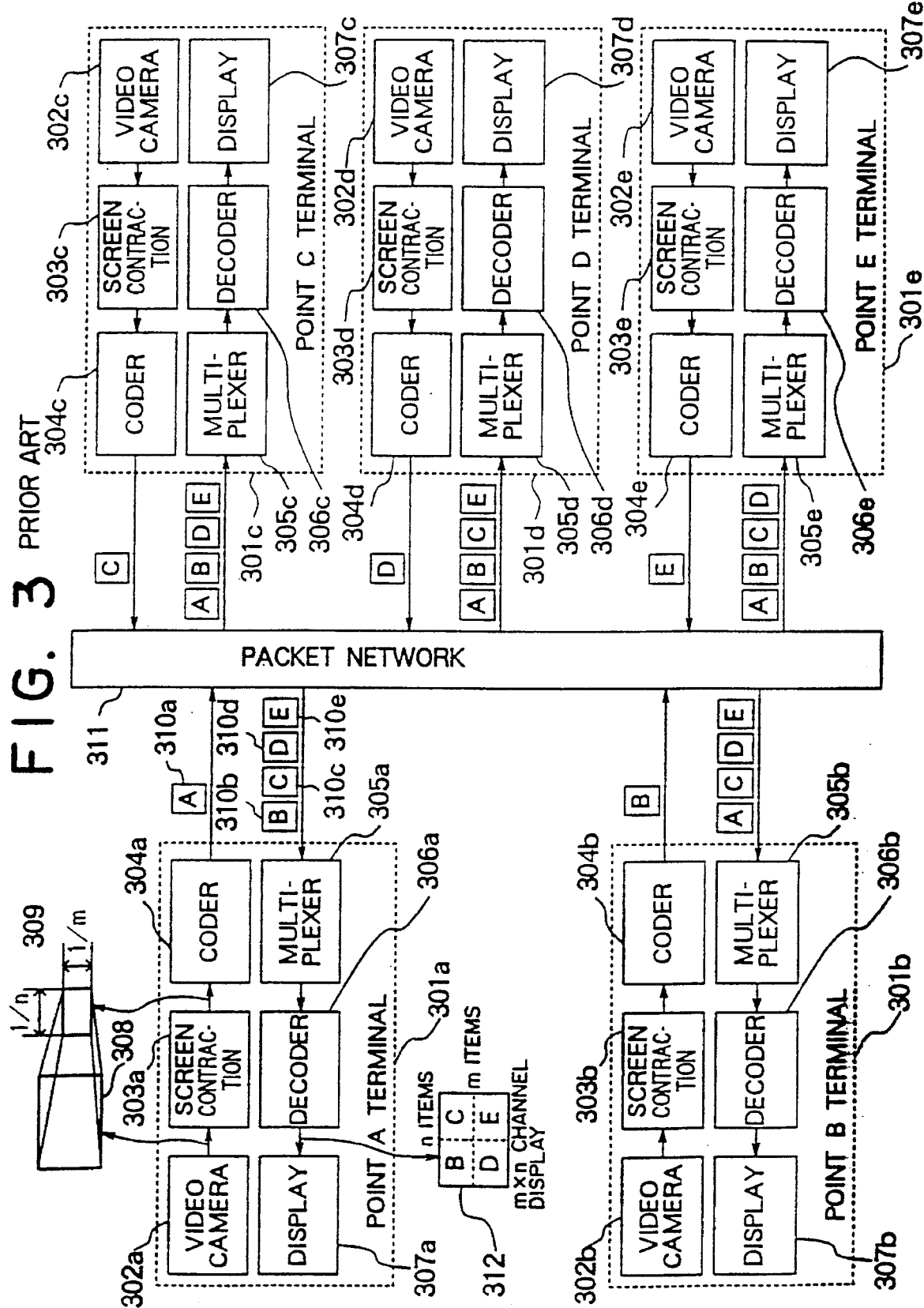
FIG. 3 is a diagram showing a third conventional example of the conference system.
Figure 4:
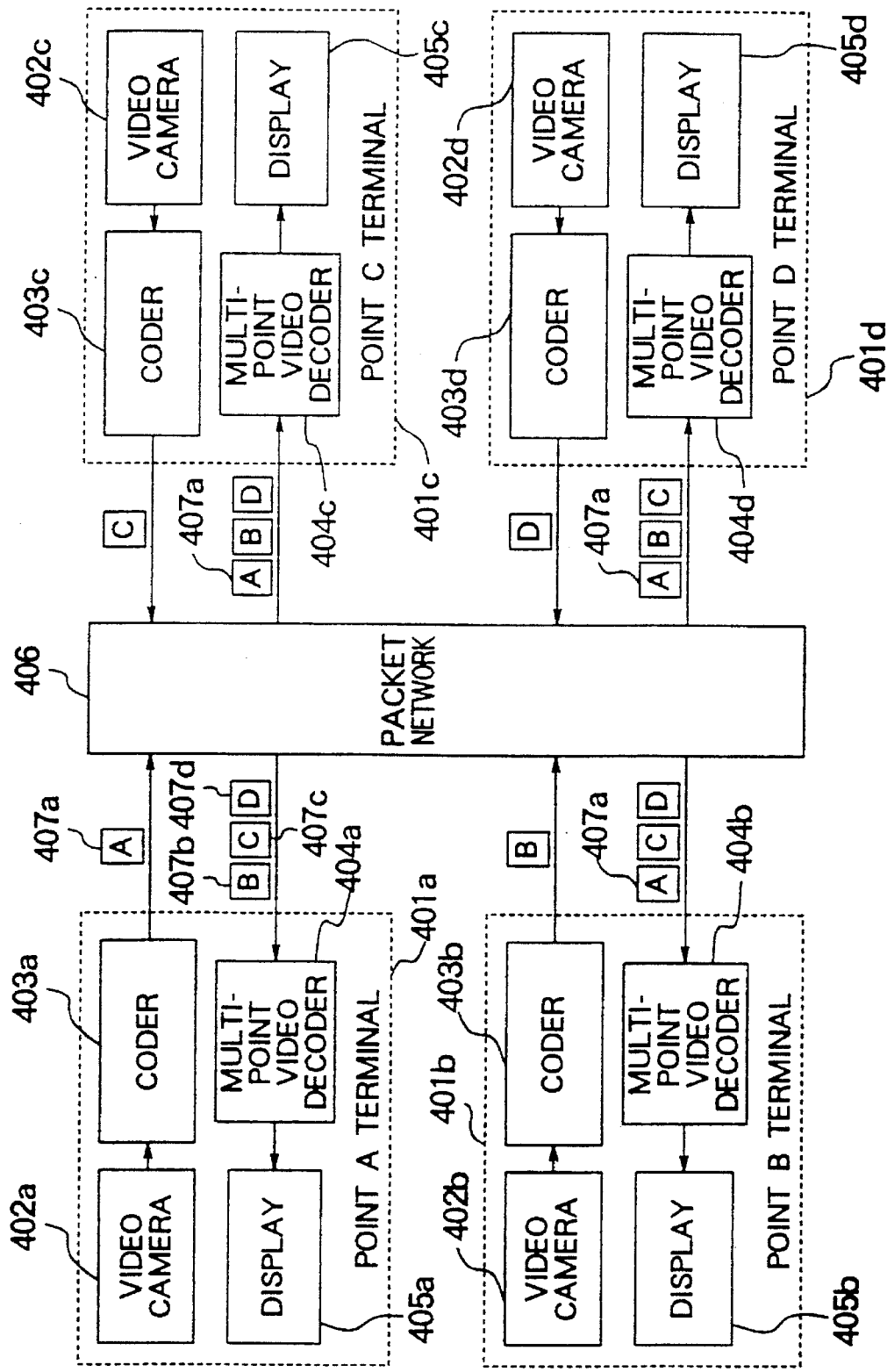
FIG. 4 is a diagram showing the configuration of a multi-point video conference system employing a multi-point video coding and decoding apparatus according to the present invention.

FIG. 4 shows an example of the constitution of a multi-point video conference system according to the present invention. Although the example includes terminals disposed at four sites, the number of terminal points can be set to an arbitrary value n (n is an integer not less than two). Reference numerals 401a to 401d denote motion picture conference terminals at points A to D, respectively. A reference numeral 406 denotes a packet network to switch coded video packets transmitted from the respective terminals. Numerals 407a to 407d designate coded video packets transmitted from the terminals at the points A to D, respectively.

Since each terminal conducts basically the same operation, description will be representatively given of the terminal 401a at the site A. On the sender side, a motion picture is produced by a video camera 402a such that resultant data of the motion picture is sent to a coder 403a. In the coder 403a, a redundant portion is removed from the data and the obtained data is subjected to compression in translation processing so as to establish a matching between the data and the network 406 (information compression). In addition, information thus compressed is subdivided into small units called packets 407a or cells to be sequentially sent to the network 406. On the other hand, on the receiver side, the packets 407b to 407d transmitted respectively from the terminals 401b to 401d at the respective points are received by a multi-point video decoder 404a so as to rebuild the original motion pictures, thereby presenting the pictures on a display 405a.

As for a remarkable aspect of the present invention, description will be given later of a specific configuration and concrete operations of the decoder 404a.

Figure 5:
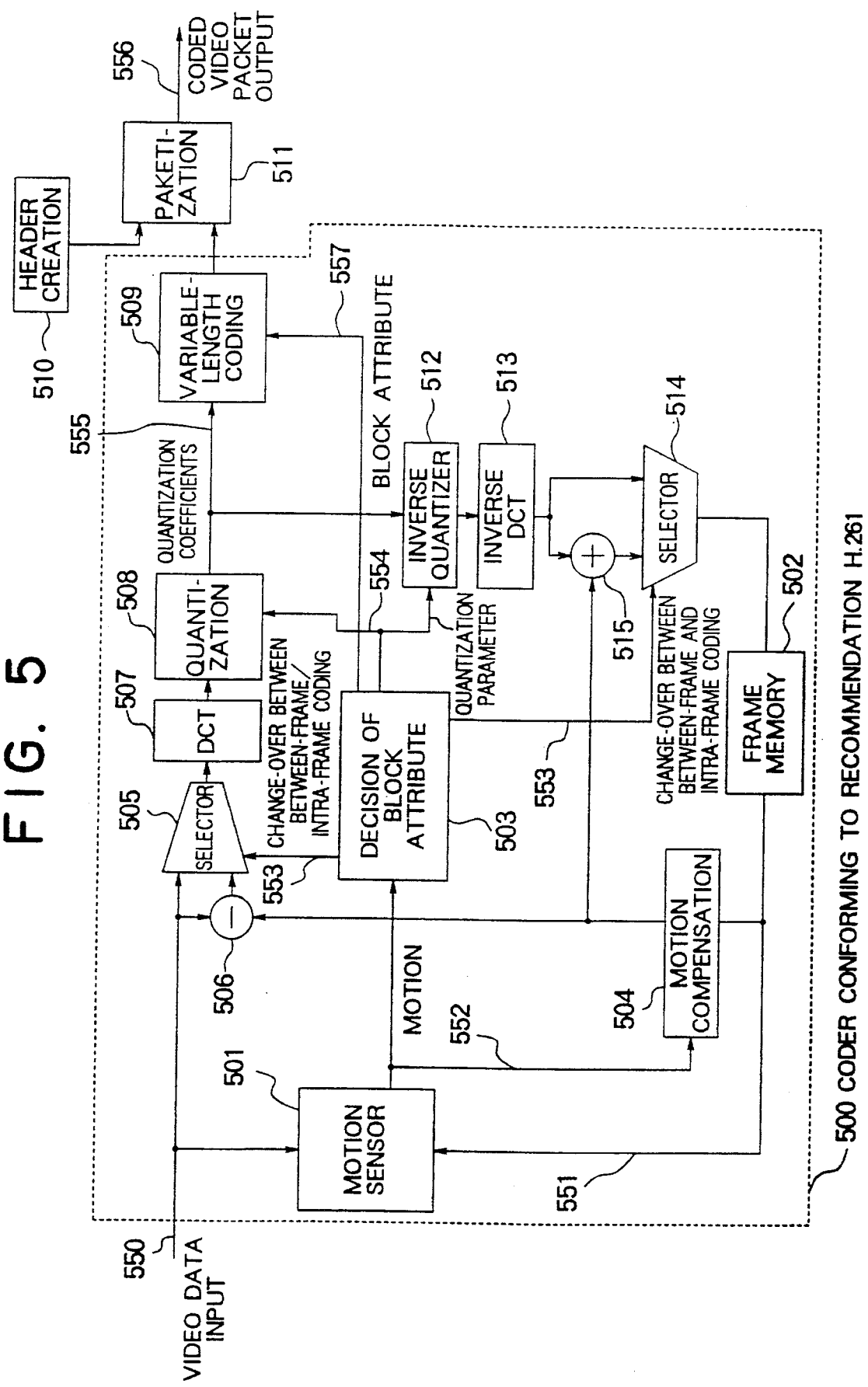
FIG. 5 is a diagram showing the structure of a coder of a terminal in a multi-point conference system according to the present invention.
Figure 6:
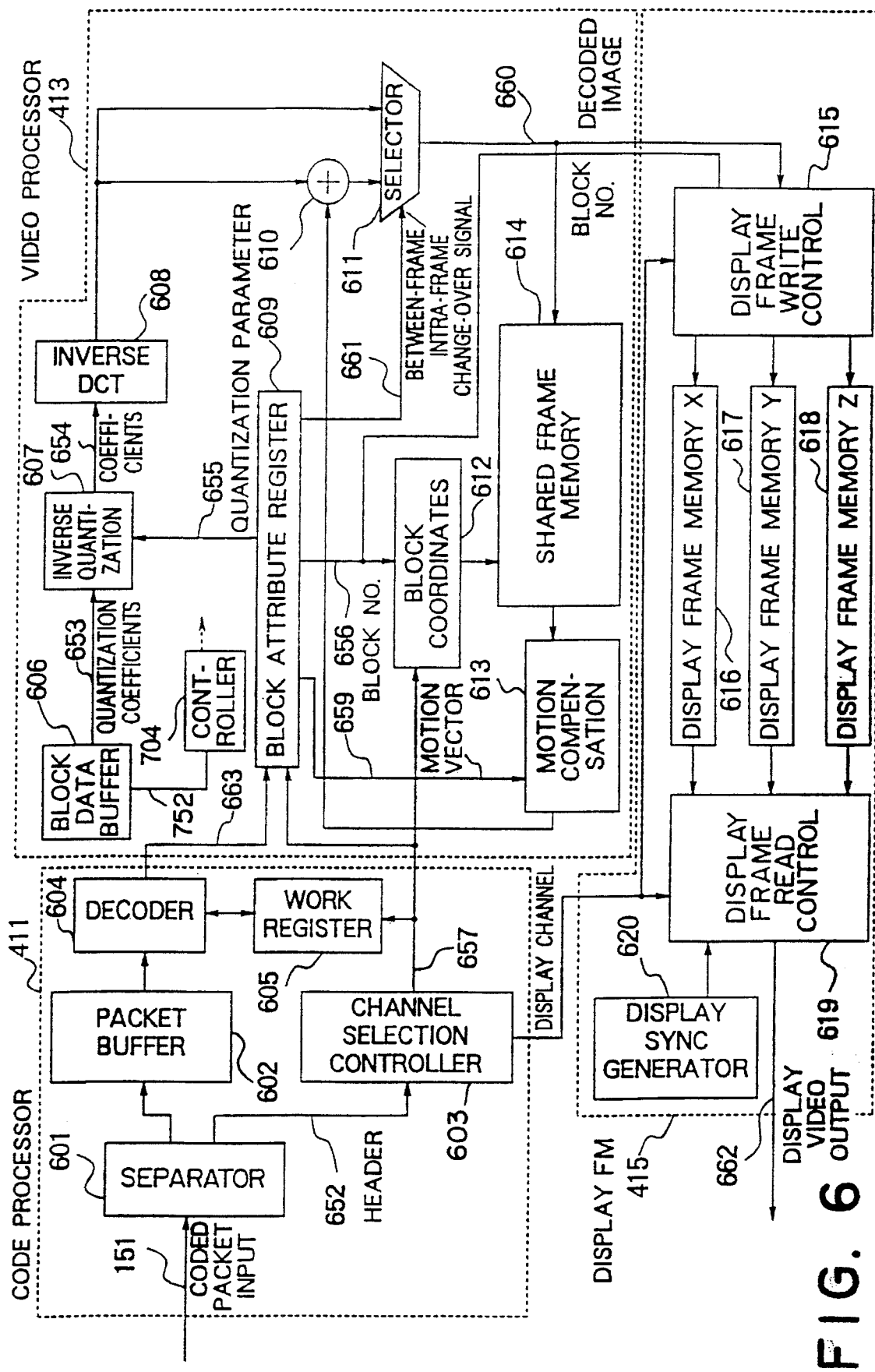
FIG. 6 is a diagram showing the constitution of a multi-point video encoding and decoding apparatus of a terminal in a multi-point conference system according to the present invention.

FIG. 5 shows an example of the internal structure of the coder 403a. As described above, this embodiment is formed in conformity with the standardization recommendation H. 261 of the CCITT. In the system, a portion 500 enclosed with dotted lines functions as a coder implemented according to the CCITT recommendation H. 261. The coder 500 accomplishes operation comparable to that stipulated by the CCITT. The algorithm of this section may be replaced with another algorithm similar thereto. Description will now be given of operation of the coder 403a according to the present invention.

A video data input 550 is subdivided into blocks. According to information of the blocks and an image encoded at a time in advance by one frame relative to the data 550 and stored in a frame memory 502, there is obtained a motion 552 by a motion estimation processor 501. Based on the quantity of motion 552, it is decided by a block attribute deciding section 503 whether the pertinent block is subjected to an intra-frame encoding or a between-frame (i.e., interframe) encoding, thereby outputting a flag 553 for changing over between these encoding operations. When the correlation between frames is small, the input 550 is selected by a selector 505. For a large correlation between frames, a difference between the input image 550 and a motion compensation image is attained by a subtracter 506, the compensation image being obtained through compensation by a motion compensation processor 504 for a motion of the image previously encoded and stored in the frame memory 502. The difference is selected by the selector 505. Moreover, in the section 503, there is also determined a quantization parameter 554 indicating a quantization step for a quantizer 508 according to the above information as well as information of the line status and the like supplied from an external device. The parameter 554 and an address or coordinates of a block of the quantization parameter 554 are outputted as a block attribute 557. Next, the signal selected by the selector 505 is converted by an orthogonal transform processor 507 into orthogonal transform coefficients. The coefficients are then quantized by the quantizer 508 according to the parameter 554 so as to produce quantization coefficients 555.

An integral number of blocks containing the coefficients 555 and the block attribute 557 which have been converted into the variable length codes as above are inputted to a packetizer section 511. A header created by a header generator 510 is added thereto to produce an output signal of an encoded video packet 556 having substantially a fixed length. The header includes information items related to a terminal such as a packet length, a packet number, a terminal identifier, and a terminal resolution.

Supplied to an inverse quantizer 512 are the coefficients 555 to be subjected to an inverse quantization according to the parameter 554. In an inverse orthogonal transform section 513, the coefficients thus inversely quantized undergo an inverse orthogonal transformation. When the flag 553 in the block being processed indicates the intra-frame encoding, a selector 514 selects information directly from the section 513. When the flag 553 designates the between-frame encoding, the between-frame estimation signal and the information from the section 513 are added to each other by an adder 515 to select the resultant signal as an output therefrom. The selected video signal is stored in the memory 502. Thereafter, the signal is referenced when a subsequent frame is encoded.

Referring now to FIGS. 6 to 10, description will be given of an example of a specific configuration of the decoder 404a. The example is constructed also according to the recommendation H 261 of the CCITT. In this constitution, the algorithm may be altered in association with each sender side.

The decoder 404a of the present invention primarily includes three component sections including a code processor 411 for interpreting a coded video packet 451 inputted thereto, a video processor section 413 for restoring an image according to the interpreted information, and a display frame memory section 415 for simultaneously producing a plurality of images thus restored.

The section 411 includes a separator 601 for splitting an encoded video packet 651 inputted thereto into a header portion 652 and a remaining portion other than the header, a packet buffer 602 for temporarily storing therein information of codes other than the header, a channel selection controller 603 for generating a receiving channel change-over signal 657 according to the header 652, a decoder 604 for quantizing the code information of the packet other than the header together with attribute information in a block-by-block fashion, and a working register 605 operative in relation to a change-over operation between channels for temporarily storing therein from the decoder 604 information related to the block being decoded.

Next, operations of primary sections of the processor 411 will be described by reference to FIG. 7. The packets 451 are sequentially transmitted via the network 406. In the separator 601, the packet 451 is partitioned into the header 652 and the remaining code information. The decoder 604 is a section to interpret code information of the codes of the packets other than the header, the packets being transmitted via several channels in the time-sharing manner. A variable-length decoder 701 receives as an input thereto the code information 751 other than the header to decode the information 701 by reference to a code table 702.

The decoder 701 produces two kinds of information. The first kind of information is block attribute information indicating a block attribute such as information denoting either one of a block position, a motion compensation vector, and an intra-frame or between-frame encoding. The information is outputted to a block attribute first-in first-out (FIFO) memory 703 which is a constituent element of the decoder 604. As the second kind of information, there are produced quantization coefficients. The coefficients are attained by achieving an orthogonal transformation for video or image information of a block inputted to the decoder 701. The resultant coefficients are supplied to the video processor 413.

To process in a time sharing fashion the packets transmitted through the respective channels, a plurality of working data areas 705a to 705c are disposed in the register 605. These areas are arranged respectively in association with the channels. When the interpretation process is finished for a packet in the register 605, the receiving channel information 657 designating a transmission source of a subsequent packet is inputted to the register 605. In accordance with the information 657, a change-over occurs between the areas 705a, 705b, and 705c. Even when the channel is thus switched by the mechanism, data items received from the channels can be independently accomplished. Namely, the decoding operations of the respective channels are carried out without causing any interference with each other.

Returning now to FIG. 6, an example of the specific configuration of the video processor 413 will be described. The processor 411 includes a channel selection controller 603 for selecting a receiving channel. The processor 413 includes a shared frame memory 614 for storing therein the plural images. Concrete configurations and operations thereof will be described later in detail.

Next, description will be given of a connecting section between the processors 411 and 413. Quantization coefficients are stored in a block data buffer 606. The processor 413 executes processing for each block, namely, in the block unit. Consequently, the processing is commenced only when at least one block of quantization coefficients is accumulated in the buffer 606. When the block is thus stored, the buffer 606 generates a one-block data ready flag 752. In response thereto, a controller 704 sends a processing start signal to the video processor 413. Specifically, the controller 704 outputs control signals to the respective constituent elements of the processor 413. However, only some of the control signals are shown in the drawings. In response to such a control signal not shown, the processor 413 initiates reading the block of quantization coefficients from the buffer 606 and the block attribute of the pertinent block from the FIFO memory 703, thereby starting the processing.

The video processor 413 includes a block data buffer 606 for storing therein at least one block of quantization coefficients delivered from a decoder 604, a block attribute register 609 for storing therein block attribute data 663 being processed, an inverse quantizer 607 for inversely quantizing quantization coefficients 653 outputted from the buffer 606 according to a quantization parameter 655, an inverse orthogonal transform processor 608 for conducting an inverse orthogonal transformation of coefficients 654 thus inversely quantized, an adder 610 for adding an output from the processor 608 to a between-frame estimation value produced from a motion compensation processor 613, and a selector 611 for receiving as inputs thereto an output from the adder 610 and an output from the processor 608 and conducting a selecting operation according to an intra-frame encoding/between-frame encoding change-over flag 661. For the intra-frame encoding, the output from the adder 610 is selected; whereas, for the between-frame encoding, the output from the processor 608 is selected. The obtained signal is outputted therefrom as a decoded image 660. The video processor 413 further includes a shared frame memory 614 for storing therein decoded images of the related channels, a block address calculator 612 for computing read/write coordinates of the frame memory 614 according to a reception channel signal 657 and a block number 656 of the block being processed, and a motion compensation processor 613 operative according to a motion vector 659 for obtaining an estimated image between motion compensation frames according to a previously decoded image stored in the memory 614.

Figure 8:
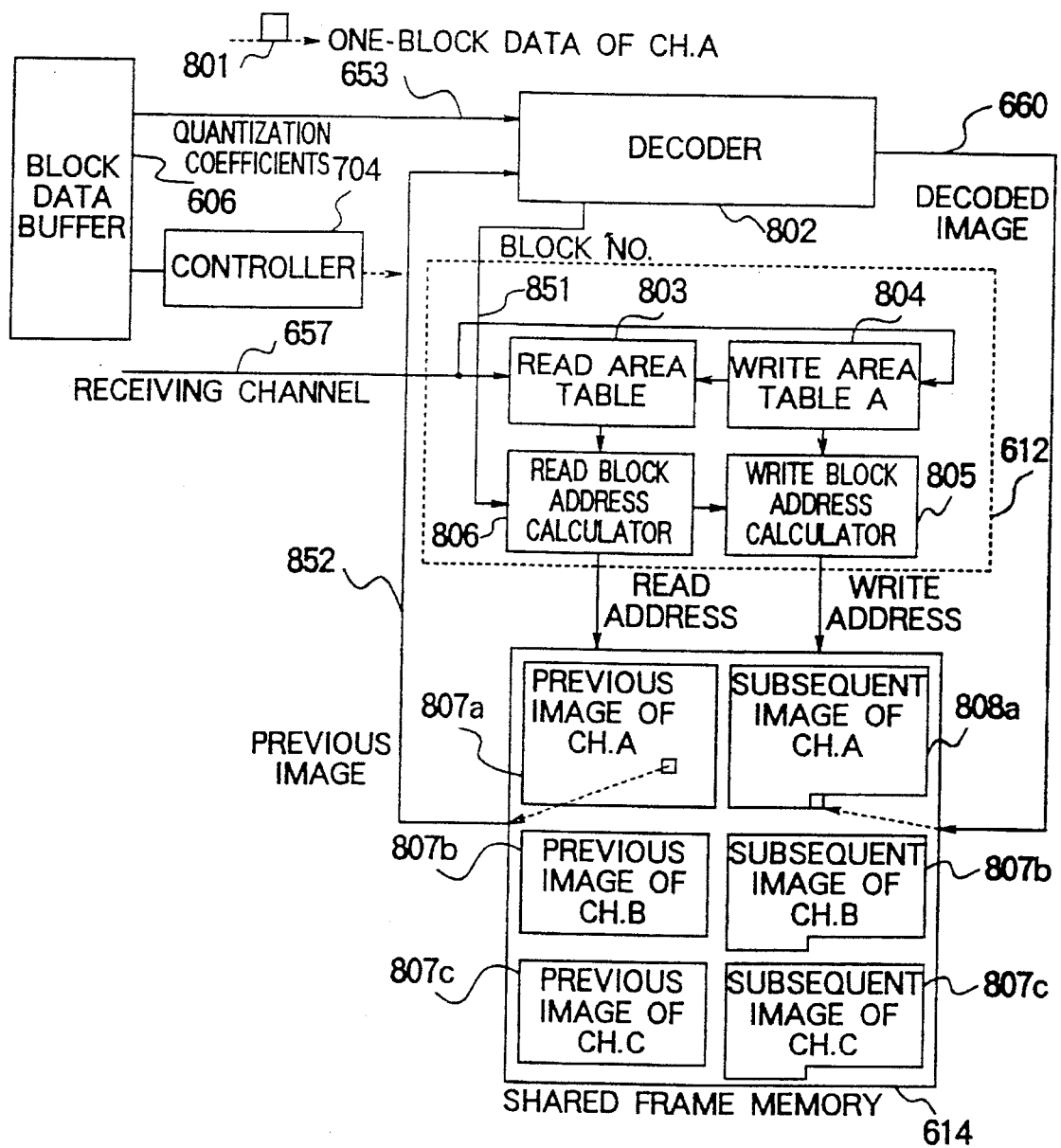
FIG. 8 is a diagram showing a video processor of a multi-point video decoder according to the present invention.

The operation of the processor 413 will now be described in more detail by reference to FIG. 8. The processor 413 is a section for processing and producing decoded images of several channels in a time sharing manner. In the memory 614, there are independently prepared image storage areas 807a to 807c for respectively storing therein previous images of the respective channels and image storage areas 808a to 808c for respectively storing therein images currently being decoded for the associated channels. A decoder section 802 conducts operations in the block unit. In the decoder 802, there are arranged a processing section including the motion compensation processor 613, the inverse quantizer 607, the inverse orthogonal transform processor 608, the block attribute register 609, the adder 610, and the selector 611. For example, when achieving processing for a channel A, the decoder 802 operates as follows. While receiving one block of image data 801 via the channel A, the section 802 simultaneously reads a previous image 852 of the pertinent block from the storage area 807a of the memory 614, the area 807 being disposed to keep therein an image decoded at a point of time advanced by one frame relative to the pertinent block. As a result, a decoded image 660 is written in the memory 614. In the memory 614, the storage area of the previous image 852 are controlled for each channel according to a read area table 803. From the storages areas, an objective storage area to read data therefrom is selected according to the receiving channel information 657. A read block address calculator 806 computes a read address including coordinates according to a block number 851 being processed and an output from the table 803 so as to feed the address to the memory 614. Similarly, the storage areas of images of the respective channels under the decoding operation are controlled according to a write area table A 804. An objective write area is determined according to the information 657. A write block address calculator 805 computes a write address including coordinates according to a block number 851 being processed and an output from the table 804 and sends the obtained signal denoting the write address to the memory 614. When the frame is completely processed for the channel, information indicating the termination of the processing is written in the table 803 so that the information in the related write area indicates a read area when processing a subsequent frame. Moreover, a new write area is reserved at the same time. Thanks to the configuration, the number of receiving channels can be arbitrarily specified within the limitation of the memory capacity. In addition, the respective channels are processed independently of each other. Furthermore, for each channel, the resolution of the image communicated therethrough can be freely specified and can be dynamically changed. According to the embodiment, the shared frame memory 614 includes a single frame memory. In actual cases, however, the memory may be configured with several memory blocks, for example, in association with the write and read sides, the respective channels, and the like.

Returning again to FIG. 6, description will be given of an outline of the display frame memory 415. In accordance with the embodiment, the memory 415 includes at least three sets (sides) of display frame memories X to Z (616 to 618), a display frame memory write controller 615 for controlling write operations of decoded images in the memories X to Z, a display frame memory read controller 615 for controlling read operations of the memories X to Z, and a display sync generator 620 for generating a synchronizing signal for display operations.

Figure 9:
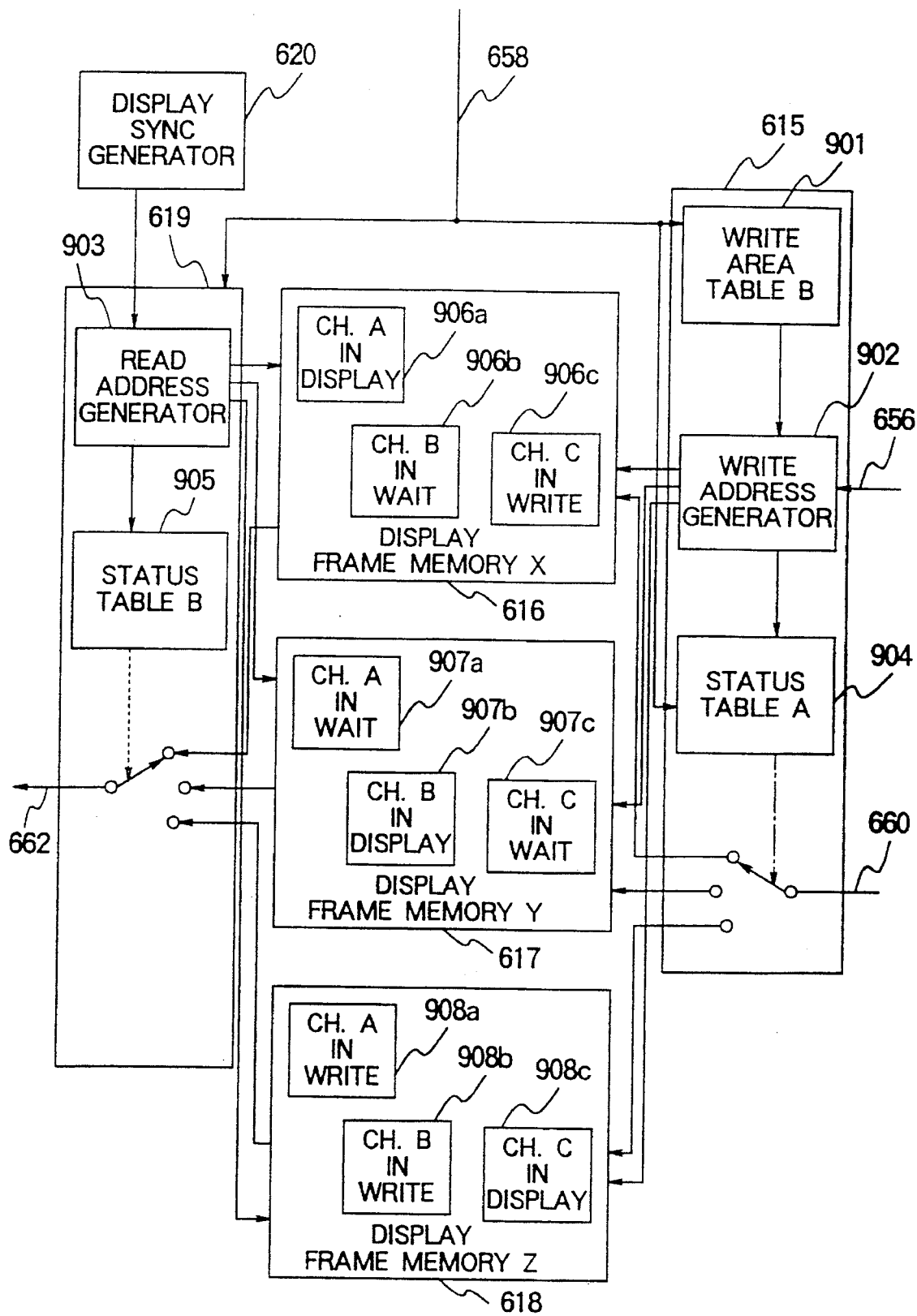
FIG. 9 is a diagram showing a display frame memory section of a multi-point video decoder according to the present invention.

Referring now to FIG. 9, description will be given of a specific configuration and operation of the memory 415.

This section includes three sets of frame memories X to Z (616 to 618) and peripheral sections thereof. In the memory 415, images 660 asynchronously arriving thereat via the respective channels are synchronized so as to produce an output signal 662. In the memories X to Z, there are independently reserved areas to respectively store therein decoded images of the related channels. For example, when images received via the channels A to C are desired to be displayed on a screen, there are reserved storage areas 906a to 906c respectively for the channels A to C in the memory X 616. Each of the storage areas is set to either one of four statuses including "display", "wait", "write", and "invalid" statuses. These statuses of the storage areas are controlled according to a status table A 904 and a status table B 905. In this embodiment, statuses related respectively to write and read operations are kept in the tables A and B, respectively. As an alternative example, there may be used only one status table to collectively control write and read operations of the memory. In each memory, an area in which the image 660 received via each channel is written is controlled according to a write area table B 901. Based on the contents of the table B 901 and the block number 656, coordinates indicating an area of the memory in which the image 660 is written are created by a write address generator 902 to be sent to each memory. To write the decoded image 660 in one of three frames, the objective frame is decided by the controller 615 according to the table A 904. To display data, the read address generator creates a read address independently of operation on the write side according to a synchronizing signal generated by the generator 620 independently disposed in each terminal, thereby sending the address to each frame memory. To read data from one of three memories, the objective memory is selected by the controller 619 according to the table B so as to output the data therefrom.

Figure 10:
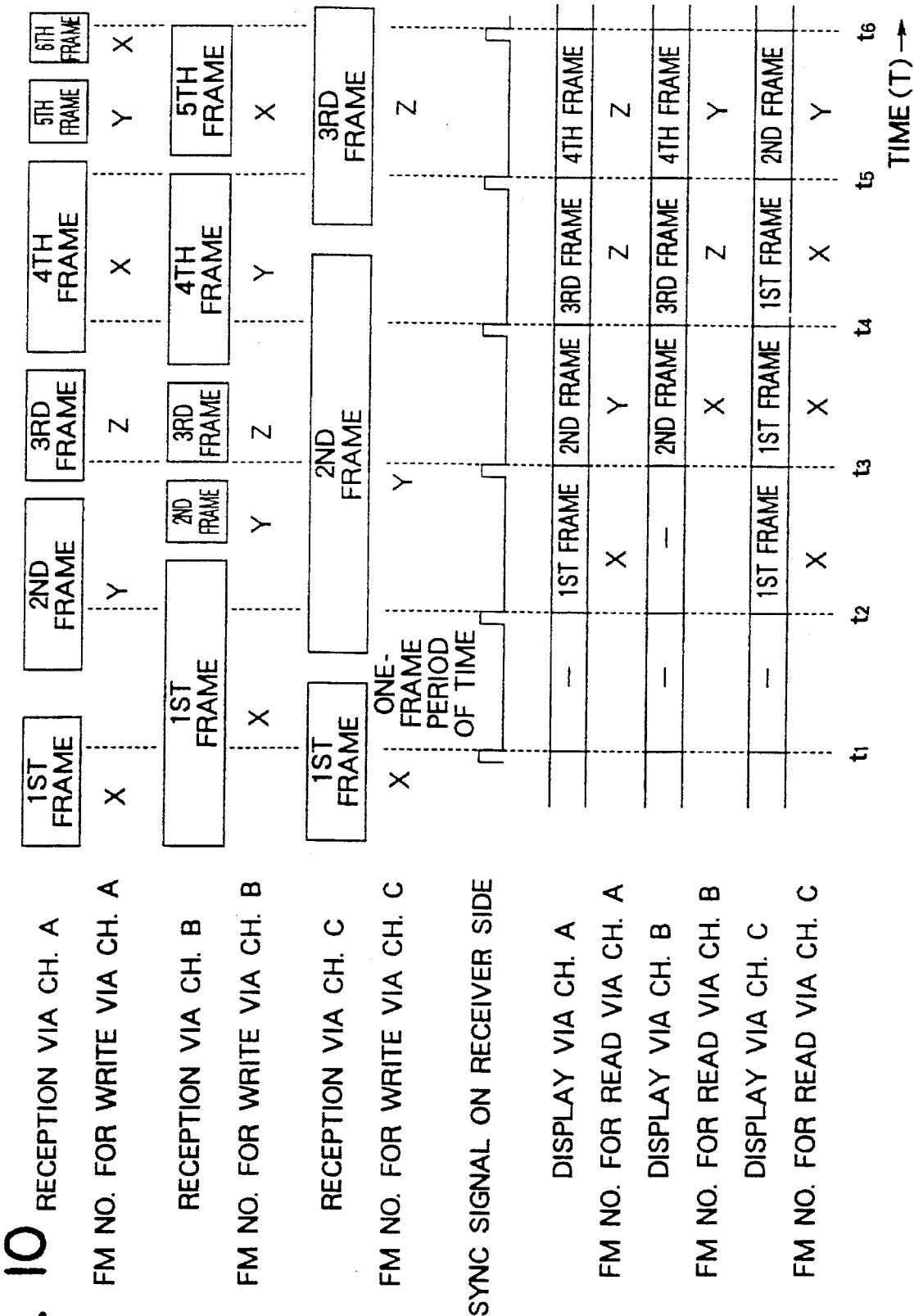
FIG. 10 is a signal timing chart showing operation of the display frame memory according to the present invention.

FIG. 10 is a signal timing chart showing operations of the memories 616 to 618 of FIG. 9. Write operations are independently conducted for the respective channels. Description will be first given of a data receiving operation via a channel A. When a new frame is received via the channel A at time t4, a write operation thereof is initiated in either one of the frame memories X and Y. The frame memory Z is being used to display data and hence is not employed for the data write operation. Namely, when the memory Z is in the display state, the frames arrived at the memory section 415 are sequentially written in the memories X, Y, X, Y, etc. in an alternate manner. When the memory Z is released from the display state, the memory Z is set to the invalid state. A frame memory in the wait state containing the latest frame for which the write operation has been terminated is then displayed and the write operation is achieved in the frame memory Z and the remaining available frame memory. For example, when a fourth frame arrives thereat while a third frame already stored in the memory Z is being displayed, the write operation of the fourth frame is initiated in the memory X. When a fifth frame is subsequently arrived thereat, the write operation thereof is commenced in the memory Y. In this situation, when the display state of the memory Z is terminated during the write operation of the memory X (t5), since the write operation of the latest frame is in process, namely, the fourth frame is being written in the memory X, the third frame of the memory Z is displayed again. Moreover, when the display state of the memory Z is finished during the write operation of the memory Y, since the write operation is already completed in the memory X, the frame memory X is then displayed. When a subsequent frame arrives, the write operation thereof is started in the memory Z. In addition, even in a case where the write operations are completed respectively in the memories X and Y, when a new frame arrives thereat before termination of the display operation of the frame memory Z, the write operation of the frame is again initiated in the memory X. With the provision in which the write operations are independently carried out for the respective channels and the synchronization timings are independently established for the write and display operations, frames arriving at the memory section 415 at timings of the respective channels can be advantageously displayed without any difficulty or trouble.

In the embodiment, an integer number of blocks are contained in each packet. However, when the packet length becomes to be equal to or less than the quantity of information equivalent to a block depending on cases or when a fixed value is stipulated as the packet length, the coders 403a to 403d and decoders 404a to 404d are required to be modified as follows.

For the coders 403a to 403d, the packetizer 511 of FIG. 5 need only be modified according to required specification. For example, when handling fixed-length packets, each time a fixed number of bits are received, a demarcation or delimiter header is added to information thus stored so as to output the obtained packet.

Figure 7:
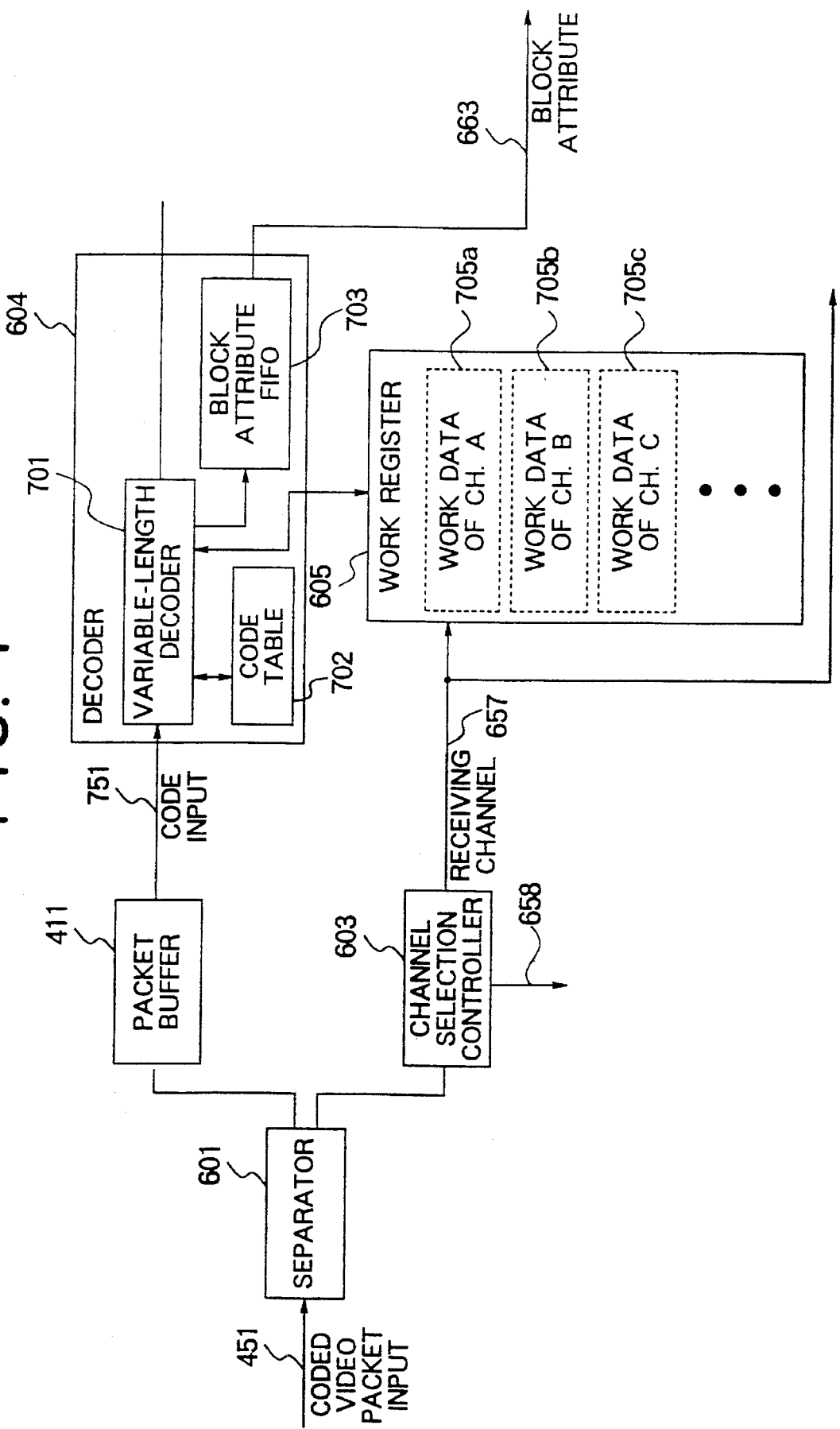
FIG. 7 is a diagram showing the construction of a code processor to process received codes in a multi-point video decoder according to the present invention.
Figure 11:
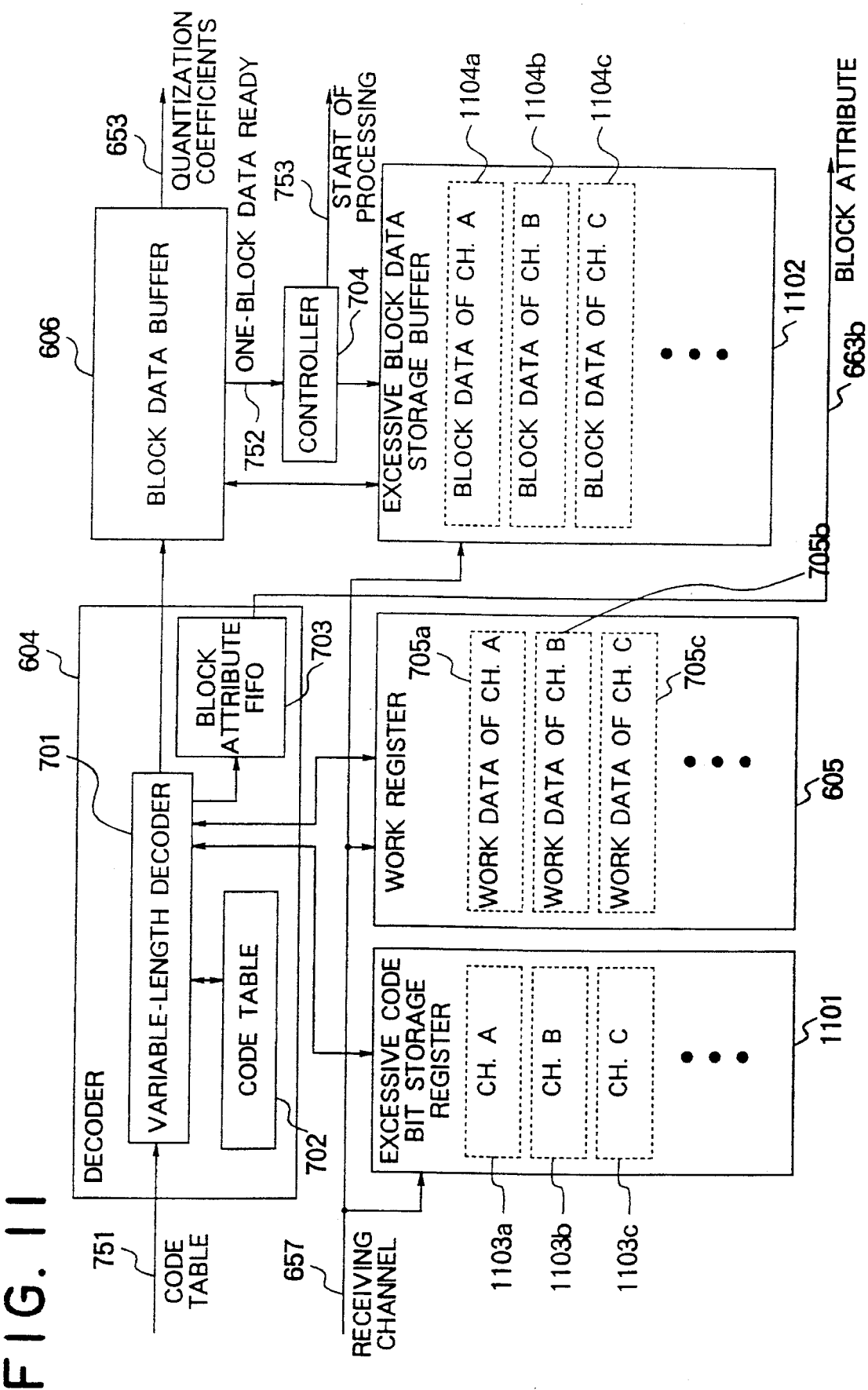
FIG. 11 is a diagram showing an alternative construction of a code processor to process received codes in a multi-point video decoder according to the present invention.

For the decoders 404a to 404d, the configuration of FIG. 7 is partially modified to configure a variation shown in FIG. 11. Modified portions are as follows. There are added a register 1101 for storing therein excessive code bits of the variable-length decoder 701 and a buffer 1102 for keeping therein excessive data of the buffer 606, the data having a data length less than the block length. In a case where the receiving channel is not changed over, there is carried out the same operation as for the construction of FIG. 7. However, there is added a function to conduct the following operation at reception of another packet.

After a packet is completely inputted, when a subsequent packet is received via another channel, the codes thus received are interpreted to the possible extent to send the interpreted codes to the block data buffer or the block attribute FIFO memory. Thereafter, remaining code bits are moved from the decoder 701 to the storage area 1103a, 1103b, or 1103c reserved for the pertinent channel in the register 1101. From the area associated with the channel of the next packet, the code bits saved as the excessive data in the previous packet processing are read therefrom so as to start again the decoding operation of the bits.

At the same time, while a block of data is being stored in the buffer 606, when a packet is received via another channel, coefficient data remaining in the buffer is saved in the area 1104a, 1104b, or 1104c reserved for the pertinent channel in the buffer 1102. Simultaneously, from the area corresponding to the channel of the subsequent packet, the excessive coefficient data of the previous packet is obtained. In addition thereto, there can be considered a variation in which block data buffers 606 are prepared as many as there are receiving channels such that a change-over operation is conducted according to the channel of a received packet.

Furthermore, as described above, the embodiment is implemented according to the algorithm conforming to the recommendation H. 261 for the video coding standardization of the CCITT with modifications to cope with the packet transmission and the multi-point connection. With a method materialized according to the coding algorithm using correlation between frames in the block unit, for example, a vector quantization method, there can be obtained an advantageous effect similar to that of the present invention only by applying similar modifications according to the present invention.

Moreover, in a case where an algorithm adopting correlation between a plurality of frames or fields is employed in the coding or decoding operation, a necessary number of frame memories 502 of the coder and a required number of shared frame memories 616 to 618 of the decoder need only be disposed to achieve the processing.

A case where the functions above are implemented primarily by processing of software is also included in the scope of the present invention.

According to the present invention as described above, only one coding and decoding apparatus is required to be installed to conduct video communications to and from a plurality of points. Moreover, the communications with the respective sites can be independently controlled, which leads to a remarkable advantageous effect in practices.

While particular embodiments of the invention have been shown and described, it will be obvious to those skilled in the art that various changes and modifications may be made without departing from the present invention in its broader aspects.

We claim:

1. A display system for displaying a plurality of video windows on a display screen comprising:

a receiving means for receiving video data packets from a plurality of video sources in a time sharing manner, each of said video data packets including coded video information for representing a partial image contained within one of a plurality of blocks constituting a video frame, attribute information for indicating at least a location of a block corresponding thereto within the video frame and identification information of the video source;

a decoder means connected to said receiving means for decoding the coded video information extracted from each of said video data packets and for outputting a partial image corresponding to one of said blocks in the video frame;

a set of frame memories for assembling partial images into video frames, each of said frame memories having a plurality of window areas located in a predetermined layout defined therein, a set of said window areas each located at a same location within respective said frame memories being associated with a same video source with respect to each other;

a writing means for writing each partial image derived from said decoder means into one of said window areas within one of said frame memories which is specified in accordance with the identification information extracted from a video data packet related to the partial image and a utilization status of said window areas; and an outputting means for selectively outputting contents of said frame memories on a display screen by changing over said frame memories depending upon a display position on the display screen thereby to present a plurality of video frames at a plurality of window areas on the display screen.

2. A display system as claimed in claim 1, further comprising memory means for keeping therein status information for each of said window areas, said writing means operating by referencing said memory means so as to write said partial image into one of said set of window areas which is specified by the identification information and as indicated in a status available for a write operation by said status information, and said outputting means operating by referencing said memory means so as to selectively, output the contents of one of said window areas which is indicated by said status information as in an output waiting status or in an output execution status.

3. A display system as claimed in claim 1, wherein said decoder means comprises memory means for storing said coded video information for each video source until an amount of the coded video information sufficient to produce one partial image is prepared in the decoder means.

4. A display system as claimed in claim 1, wherein said receiving means is connected so as to receive said video data packets transmitted from at least one remote terminal through a communication network.

5. A display system as claimed in claim 1, wherein said decoder means comprises a means for producing partial images from first coded video information coded through an intra-frame encoding, and a means for producing partial images from second coded video information coded through an inter-frame encoding.

6. A terminal system for displaying a plurality of video frames on a display screen comprising:

a means for sequentially supplying video data packets each of which includes coded video information related to one of a plurality of blocks constituting a video frame, attribute information for indicating a location of a block corresponding thereto within the video frame and identification information of a video source;

a decoder means connected so as to receive said video data packets for decoding the coded video information extracted from each of said video data packets to output a partial image;

a set of frame memories for assembling partial images into video flames;

a memory means for storing control information for indicating a status of each of a plurality of video areas defined within each of said frame memories in a predetermined layout and correlation between the video areas and video sources;

a writing means for writing the partial image output from said decoder means into one of said video areas within one of said frame memories specified by the control information in the memory means and the identification information extracted from the video data packet related to the partial image; and an outputting means for selectively outputting the contents of said frame memories on a display screen by changing over said frame memories depending upon a status of said video areas thereby to present a plurality of video flames at a plurality of video areas on the display screen.

7. A terminal system as claimed in claim 6, wherein said decoder means comprises a buffer memory means for storing said coded video information for each video source until an amount of the coded video information necessary to produce one partial image is prepared in said decoder means.

8. A terminal system as claimed in claim 6, wherein said means for sequentially supplying said video dam packets is connected so as to receive video data packets transmitted from at least one remote terminal through a communication network.

9. A terminal system as claimed in claim 6, wherein said decoder means comprises a means for producing partial images from first coded video information coded through an intra-frame encoding, and a means for producing partial images from second coded video information coded through an inter-frame encoding.

* * * * *